(12) United States Patent
Petrenko

(10) Patent No.: US 7,138,599 B2
(45) Date of Patent: Nov. 21, 2006

(54) PLASMA-BASED DE-ICING

(75) Inventor: Victor F. Petrenko, Lebanon, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 681 days.

(21) Appl. No.: 10/043,752

(22) Filed: Jan. 9, 2002

(65) Prior Publication Data
US 2002/0170909 A1     Nov. 21, 2002

Related U.S. Application Data

(60) Continuation-in-part of application No. 09/426,685, filed on Oct. 25, 1999, now Pat. No. 6,563,053, which is a division of application No. 09/094,779, filed on Jun. 15, 1998, now Pat. No. 6,027,075, which is a continuation-in-part of application No. PCT/US00/05665, filed on Mar. 1, 2000, which is a continuation-in-part of application No. PCT/US99/28330, filed on Nov. 30, 1999, which is a continuation-in-part of application No. PCT/US99/25124, filed on Oct. 26, 1999.

(60) Provisional application No. 60/272,747, filed on Mar. 1, 2001, provisional application No. 60/131,082, filed on Apr. 26, 1999, provisional application No. 60/122,463, filed on Mar. 1, 1999, provisional application No. 60/110,440, filed on Dec. 1, 1998, provisional application No. 60/105,782, filed on Oct. 27, 1998.

(51) Int. Cl.
*B23K 10/00* (2006.01)

(52) U.S. Cl. .......................... 219/121.37; 219/121.59; 219/121.38; 219/121.51; 315/111.21; 244/134 R; 244/134 D

(58) Field of Classification Search .......... 219/121.37, 219/121.38, 121.59, 121.52, 121.48, 121.54; 315/111.51, 111.21; 244/134 R, 134 D, 244/134 C, 134 A, 163, 158 R; 118/723 R, 118/723 I
See application file for complete search history.

(56) References Cited

U.S. PATENT DOCUMENTS 3,856,979 A * 12/1974 Schmid ................... 174/68 R
3,964,183 A   6/1976 Mouat (Continued)

FOREIGN PATENT DOCUMENTS

GB         1096087    * 12/1967

(Continued)

OTHER PUBLICATIONS

"Power lines may clean air pollution", Gemini No. 4 Dec. 1996, pp. 1-3.*

*Primary Examiner*—Mark Paschall
(74) *Attorney, Agent, or Firm*—Lathrop & Gage LC

(57) ABSTRACT

An electrical conductor and a gas-filled layer are located at or near the surface of an object being deiced. The conductor carries an AC voltage that generates an alternating electric field in the gas-filled layer. A conductive layer increases the electric field strength in the gas-filled layer between the electrical conductor and the conductive layer. The alternating electric field causes electric breakdown of gas and plasma-formation in the gas-filled layer. The plasma absorbs energy released during electric discharge through the plasma, which heats ice, causing it to melt. The alternating electric field typically has a field strength in a range of about from 1 to 100 kV/cm. The AC voltage typically has an amplitude in a range of about from 10 kV to 1300 kV, and a frequency in a range of about from 50 Hz to 1 MHz. The gas-filled layer includes a plasma-forming gas selected from, among others, air, nitrogen and argon.

30 Claims, 6 Drawing Sheets

U.S. PATENT DOCUMENTS

| | | |
|---|---|---|
| 4,135,221 A | 1/1979 | Genrikh et al. |
| 6,102,333 A * | 8/2000 | Gerardi et al. .......... 244/134 R |
| 6,218,647 B1 * | 4/2001 | Jones .......................... 219/501 |
| 6,478,259 B1 * | 11/2002 | Cordaro ...................... 244/163 |
| 6,570,333 B1 * | 5/2003 | Miller et al. ............ 315/111.21 |

FOREIGN PATENT DOCUMENTS

| | | |
|---|---|---|
| GB | GB 2 252 285 A | 8/1992 |

* cited by examiner

PLASMA-BASED DE-ICING

RELATED APPLICATIONS

This application claims the benefit of U.S. provisional application Ser. No. 60/272,747, filed Mar. 1, 2001. This application is also a continuation-in-part application of commonly-owned and U.S. patent application Ser. No. 09/426,685, filed Oct. 25, 1999 now U.S. Pat. No. 6,563,053, which is a divisional application of U.S. patent application Ser. No. 09/094,779, filed Jun. 15, 1998, issued as U.S. Pat. No. 6,027,075 on Feb. 22, 2000. This application is also a continuation-in-part application of commonly-owned and PCT application PCT/US99/25124, filed 26 Oct. 1999, which claims the benefit of U.S. provisional application Ser. No. 60/105,782, filed 27 Oct. 1998, now abandoned. This application is also a continuation-in-part of commonly-owned and PCT application PCT/US99/28330, filed 30 Nov. 1999, which claims the benefit of U.S. provisional application Ser. No. 60/110,440, filed Dec. 1, 1998, now abandoned, the benefit of U.S. in provisional application Ser. No. 60/122,463 filed Mar. 1, 1999, now abandoned. This application is also a continuation-in-part application of commonly-owned and PCT application PCT/US00/05665, filed 1 Mar. 2000, which claims the benefit of U.S. provisional application Ser. No. 60/122,463, filed 1 Mar. 1999, now abandoned, and provisional application Ser. No. 60/131,082, filed 26 Apr. 1999, now abandoned, and which is a continuation-in-part application of commonly-owned and PCT application PCT/US99/28330, filed 30 Nov. 1999. The related applications and patent named above are hereby incorporated by reference.

GOVERNMENT LICENSE RIGHTS

The U.S. Government has certain rights in this invention as provided for the terms of Grant No. DAAH 04-95-1-0189, awarded by the Army Research Office, and of Grant No. MSS-9302792, Awarded by the National Science Foundation.

FIELD OF THE INVENTION

The invention relates to methods, systems and structures for removing ice from surfaces.

BACKGROUND OF THE INVENTION

Statement of the Problem

Ice adhesion to certain surfaces causes many problems. For example, icing on power transmission lines adds weight to the power lines causing them to break. In addition to the costs of repair, the resulting power outages cause billions of dollars in direct and indirect economic damage. The large surface areas of power transmission lines exposed to icing conditions and the remoteness of many power lines require de-icing systems that are both reliable and have low costs per unit distance.

SUMMARY OF THE INVENTION

The invention provides improved systems and methods for removing ice and snow from power lines, airplane wings and other objects.

In one aspect, a system in accordance with the invention for melting the ice includes a gas-filled layer that includes a plasma-forming gas, which is selected to form a plasma in an alternating electric field. In another aspect, a system includes an electrical conductor for generating an alternating electric field in response to an AC voltage. and proximate to the electrical conductor. In another aspect, the gas-filled layer is proximate to the electrical conductor so that the alternating electric field is sufficiently strong to cause electric breakdown and plasma formation in the gas-filled layer. The plasma-forming gas may be air, nitrogen, argon or other gas. The electric breakdown discharges electrostatic energy through the plasma in the gas-filled layer. Because the plasma is conductive, the discharge of electric energy through the plasma generates resistive AC current, which heats the plasma and melts the ice.

In one aspect, the alternating electric field ("AEF") has sufficient field strength to cause electrical breakdown of air (or other plasma-forming gas in the gas-filled layer) and thereby to generate a plasma in the gas-filled layer. In another aspect, the strength of the AEF in and near the gas-filled layer is increased by the presence of an electrically conductive layer. In still another aspect in accordance with the invention, the gas-filled layer containing plasma-forming gas preferably is located between the electrical conductor and a conductive layer. Because the conductive layer is much more conductive than air (or other ambient gas), the voltage drop across the gas-filled layer between the electrical conductor and the conductive layer is much higher than in the surrounding air, increasing the electric field strength between the electrical conductor and the conductive layer. Typically, the conductive layer is an ice layer.

In another aspect, the electrical conductor is a main conductor of a power transmission line. Typically, the electrical conductor conducts an AC current at a voltage capable of generating an alternating electric field having a strength in a range of about from 1 to 100 kV/cm. The AC current typically has a frequency in a range of about from 50 Hz to 1 MHz, or higher. Generally, the voltage in the electrical conductor is in a range of about from 10 kV to 1300 kV. The gas-filled layer typically has a thickness in a range of about from 0.5 to 10 mm. In another aspect, an embodiment in accordance with the invention may further include an outer shell, the gas-filled layer being disposed between the electrical conductor and the outer shell. In another aspect, the gas filled layer may include gas-containing balls. In still another aspect, a flexible band contains a gas-filled layer, and the flexible band covers a surface being deiced.

In one aspect, methods for melting ice in accordance with the invention include creating an AEF that causes electric breakdown of gas in a gas-filled layer and thereby generates a plasma in the gas-filled layer. In another aspect, creating an AEF includes applying an AC voltage to an electrical conductor, wherein the electrical conductor is proximate to the gas-filled layer. In another aspect, the gas-filled layer is between the electrical conductor and a conductive layer. In another aspect, the gas-filled layer includes a plasma-forming gas.

Although the invention is described below principally with respect to power line de-icing, it is understood that the invention is useful in many types of applications. The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE INVENTION

Figure 1:
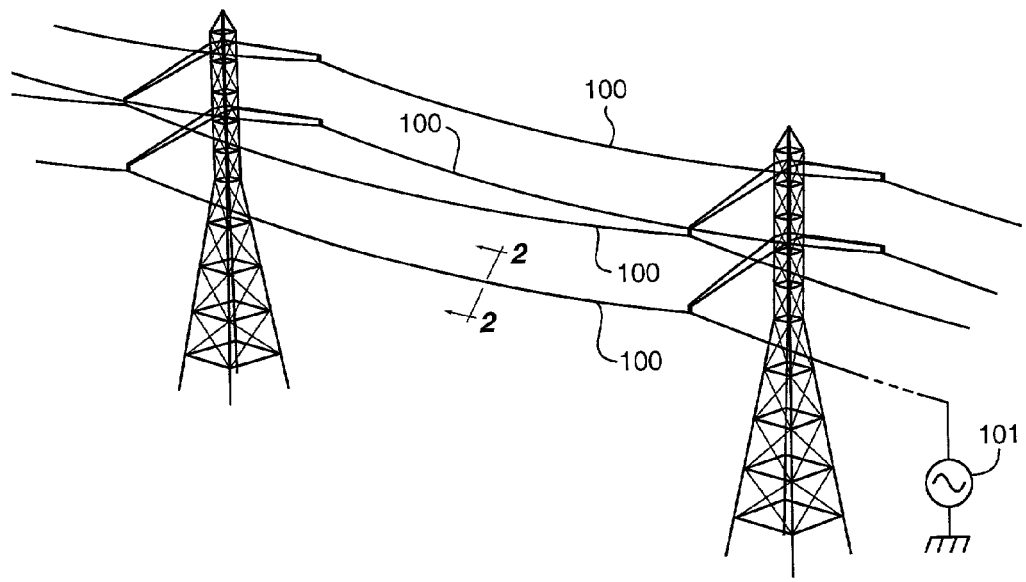
FIG. 1 shows a sketch of high-voltage power transmission lines in which an embodiment in accordance with the invention is utilized to remove ice on the power lines.

The invention is described herein with reference to FIGS. 1–13. The structures, systems and physical phenomena depicted in schematic form in FIGS. 1–13 serve explanatory purposes and are not precise depictions of actual structures, systems and phenomena in accordance with the invention. Furthermore, the embodiments described herein are exemplary and are not intended to limit the scope of the invention, which is defined in the claims below.

The invention includes methods, systems and structures that remove ice and snow on surfaces of objects by using a gas-filled layer to absorb electric energy from an alternating electric field ("AEF"). The composition and pressure of the gas in the gas-filled layer is selected so that the AEF causes electric breakdown and generates a plasma in the gas-filled layer. Electric discharge through the plasma results in Joule heating, causing ice to melt. In one preferred embodiment in accordance with the invention, the AEF causes electric breakdown and plasma formation when ice is present on the cable, but does not cause electric breakdown when there is no ice present.

A system in accordance with the invention for preventing ice and snow on a surface of an object typically includes an electrical conductor. The conductor generates an AEF in response to an AC voltage. A power source typically provides AC voltage in a range of about from 10 kV to 1300 kV. A system also includes a gas-filled layer proximate to the electrical conductor. The gas is selected so that it forms a plasma in response to the AEF. Preferably, the gas pressure is selected so that electric breakdown occurs at peak field strength. If the gas pressure in the gas-filled layer is higher than atmospheric pressure, the gas electric strength is higher than the strength at atmospheric pressure. This results in breakdown at higher voltage. If the gas pressure in the gas-filled layer is lower than atmospheric pressure, the gas electric strength is less than the strength at atmospheric pressure, and electric breakdown of the gas occurs at lower electric field strength.

Upon electric breakdown, accumulated electrostatic energy discharges through the plasma. The electric discharge through the plasma transforms energy of the electric field into heat. Without plasma, only capacitive AC current passes through the region between the power line and the ice. The conductivity of the plasma results in conductivity (resistive) AC current in the plasma. In this manner, most of the energy of the electric field accumulated in the gas-filled layer is converted by resistive AC current into heat. The thickness of the gas-filled layer is typically selected to correspond to an amount of heat desired to be generated in the gas-filled layer.

Preferably, the strength of the AEF in and near the gas-filled layer is increased by the presence of an electrically conductive layer that is electrically insulated from the electrical conductor. Preferably, the gas-filled layer containing plasma-forming gas is located between the electrical conductor and a conductive layer. Because the conductive layer is much more conductive than air (or other ambient gas), the voltage drop across the gas-filled layer between the electrical conductor and the conductive layer is much higher than in the surrounding air or other ambient gas. This increases the electric field strength between the electrical conductor and the conductive layer. Preferably, the conductive layer is an ice layer.

A gas-filled layer is "proximate" to an electrical conductor if an AEF formed by an AC voltage present in the conductor causes electric breakdown of gas in the gas-filled layer, thereby causing discharge of electrostatic energy through the resulting gas plasma in the gas-filled layer, in particular, when a conductive layer (such as an ice layer) is present. Preferably, the AEF has a field strength in a range of about from one to 100 kV/cm at the gas-filled layer. As a practical matter, the electrical conductor is typically structurally integral with the object being protected from ice and snow. For example, the conductor is included in a high-voltage power transmission line or an airplane wing. Similarly, the gas-filled layer is typically contiguous with the surface of the object, or contained within it. For example, the gas-filled layer typically covers a power line, or is included within an airplane wing, adjacent to the wing surfaces. When a heat-generating gas-filled layer is included within the surface, or is in direct physical contact with the surface, heat transfer between the gas-filled layer and the surface is usually enhanced. The term "gas-filled layer" and related terms refer to a layer containing one or a plurality of enclosed volumes of a plasma-forming gas. Since each volume of plasma-forming gas is enclosed, so that plasma gas ions are substantially retained within the gas-filled layer, an AEF having sufficient field strength generates a concentration of electrically charged plasma ions to form a plasma having sufficient electrical conductivity to produce Joule heating. Typically, a gas-filled layer is included within a region formed by an outer shell.

A conductive layer proximate to the electrical conductor that increases the strength of the AEF in the gas-filled layer may be a permanent conductive layer made from conductive metal or metal oxide. A permanent conductive layer, such as a conductive outer shell, typically has thickness of about 0.1 to 4 several millimeters. Preferably, the conductive layer is ice, which is semiconductive. Ice is sufficiently conductive at low frequencies (e.g., 100 Hz) to increase electric field strength around a power line or other electrical conductor. The conductivity of the ice increases as frequency increases.

Preferably, an outer shell in accordance with the invention is nonconductive, and the conductive layer is a layer of semiconductive ice located on the nonconductive outer shell. Such embodiments are self-regulating because when the semiconductive ice is removed through melting, the AEF strength near the electrical conductor decreases, thereby effectively stopping electric breakdown and plasma formation.

An electrical conductor in accordance with the invention may include a variety of structures and material compositions. A power transmission line typically includes a bundle of aluminum main conductor cables. An airplane wing, the hull or superstructure of a ship, or a ground transportation bridge typically include conductive metals. In other embodiments, an electrical conductor may be formed on the surface of a nonconductive object being protected by various techniques, including painting and photolithography.

In certain embodiments in accordance with the invention, for example in high-voltage power transmission lines, AC voltage for generating the AEF is generally already present. In other embodiments, a dedicated AC power source may be used to provide AC voltage; for example, in systems to de-ice airplane wings.

Figure 2:
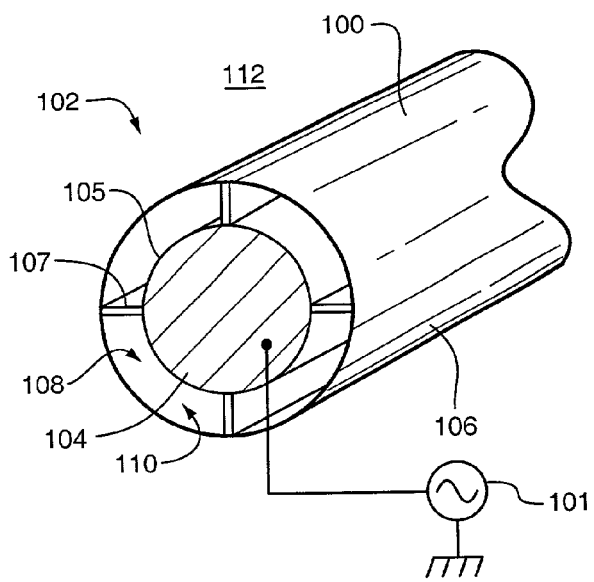
FIG. 2 shows a cross-sectional view of a power transmission line fabricated in accordance with the invention.

FIG. 1 shows a sketch of power transmission lines in which an embodiment in accordance with the invention is utilized to remove ice on power lines 100 connected to AC power source 101. FIG. 2 shows a perspective view 102 of a high-voltage power transmission line 100 constructed in accordance with the invention. Power line 100 is connected to AC power source 101. Power transmission line 100 includes a main conductor 104 with a surface 105. Main electrical conductor 104 typically carries high-voltage AC current. The AC current typically has a frequency in an approximate range of from 50 to 120 Hz. The AC voltages common in high-voltage power transmission lines typically generate a strong AEF. A typical electric field strength around a power line is just below about 30 kV/cm, which is near the electric breakdown value of air. Electrical conductor 104 is enclosed by outer shell 106. Electrically insulating solid spacers 107 separate electrical conductor 104 and outer shell 106, thereby forming space 108 between conductor 104 and outer shell 106. A gas-filled layer 110 is disposed in the space 108 between outer shell 106 and the surface 105 of main conductor 104. Preferably, outer shell 106 is electrically nonconductive. When the field strength of the AEF reaches the electric breakdown threshold of the gas in the gas-filled layer 10, electric discharge and plasma formation occur in the gas-filled layer 110. The accumulated electrostatic energy discharges through the plasma in gas-filled layer 110. Most of the energy of the electric field is thereby transformed into heat by means of conductivity (resistive) current. The heat then melts ice and snow. Thus, heat is generated from previously unused electromagnetic energy to melt or prevent ice on the power line. This embodiment utilizes the AEFs that already exist due to the high AC voltages present in a power line.

Figure 3:
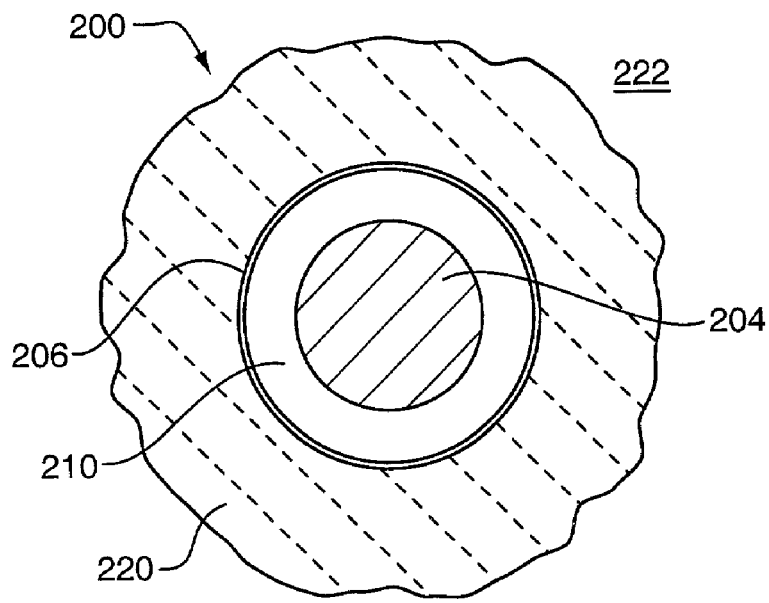
FIG. 3 depicts a conductor enclosed by an outer shell and by a gas-filled layer between the conductor and the outer shell, which are covered by an ice layer.
Figure 4:
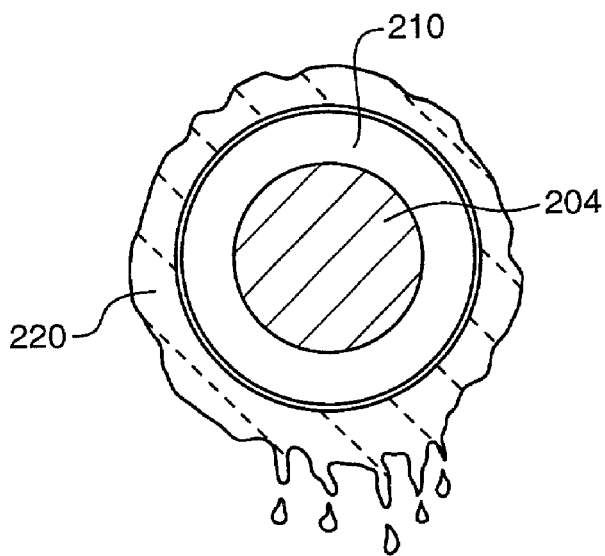
FIG. 4 depicts in schematic form the melting of ice caused by Joule heating in plasma in accordance with the invention.

FIG. 3 depicts a system 200 in accordance with the invention that includes a conductor 204 enclosed by electrically nonconductive outer shell 206 and by a gas-filled layer 210 between conductor 204 and outer shell 206. During operation, a layer of ice 220 causes an increase in the strength of the AEF in the gas-filled layer 210. The increased strength of the AEF causes electric breakdown and plasma formation in gas-filled layer 210. The discharge of accumulated electrostatic energy through the plasma causes Joule heating in accordance with the invention. As depicted in FIG. 4, the heat generated in the plasma through the absorption of electrostatic energy melts ice 220 in accordance with the invention. An advantage of such embodiments in accordance with the invention is that heating by electric discharge through the plasma does not require a "control" box to be turned "on" or "off". When ice is present and forms a conductive layer, the AEF in the gas-filled layer reaches an electric breakdown threshold. As the ice melts, the electric field strength decreases, effectively stopping electric breakdown and plasma formation, and thereby reducing energy consumption.

The thickness of the gas-filled layer in accordance with the invention is typically in a range of about from 0.5 mm to 10 mm, although other thicknesses can be applied depending upon desired heating power. Generally, the volume of the plasma-forming gas affects the amount of electric energy discharged in the gas-filled layer, and the heating power generated. The pressure of the gas in gas-filled layer 110, 210 may be above or below atmospheric pressure, depending on gas composition, power line frequency and voltage, and other selected operating variables. Depending on the composition and pressure of the plasma-forming gas, as well as on the other operating variables, the strength of the AEF utilized in a system and a method in accordance with the invention may vary. The voltage of a conventional power transmission line typically generates an AEF with a field strength at the power line just below about 30 kV/cm, which is near the electric breakdown value of air. Generally, an AEF with a field strength in a range of about from 1 kV/cm to 100 kV/cm is utilized in accordance with the invention, although field strength values above or below this range are useful. A system and a method in accordance with the invention are useful throughout the whole range of typical power transmission frequencies, that is, about from 50 Hz to 1 MHz. Similarly, they are useful throughout the typical voltage range of power transmission, that is, in a range of about from 10 kV to 1300 kV. Within these operating parameters, it is possible to achieve a practical heating power value in a range of about from 20 to 150 watts per meter length of power transmission line to melt ice. Preferably, electric breakdown occurs at peaks in AEF strength.

Figure 5:
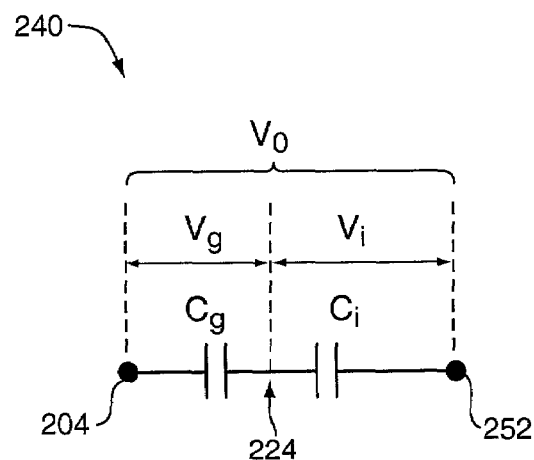
FIG. 5 shows an equivalent circuit diagram of a system operated in accordance with the invention.

FIG. 5 shows an equivalent circuit diagram 240 of system 200 operated in accordance with the invention. In FIG. 5, $V_0$ represents the voltage in electrical conductor 204; for example, a power line voltage. The symbol $C_g$ represents a combined "gap capacitance" of electrical conductor 204 and gas-filled layer 210 between electrical conductor 204 and conductive layer 224. Conductive layer 224 is typically a layer of semiconductive ice, such as ice layer 220 in FIG. 3. In other embodiments, conductive layer 224 may be a conductive outer shell. $C_i$ represents an "interwire" capacitance between conductive layer 224 and another conductor (e.g., a power transmission line), electrical ground, or some other "sink" 252. The symbol $V_g$ represents the voltage drop across gas-filled layer 210 between electrical conductor 204 and conductive layer 224. The symbol $V_i$ represents the voltage drop between conductive layer 224 and sink 252. Practically, the sum of $V_g$ and $V_i$ is $V_0$.

Figure 6:
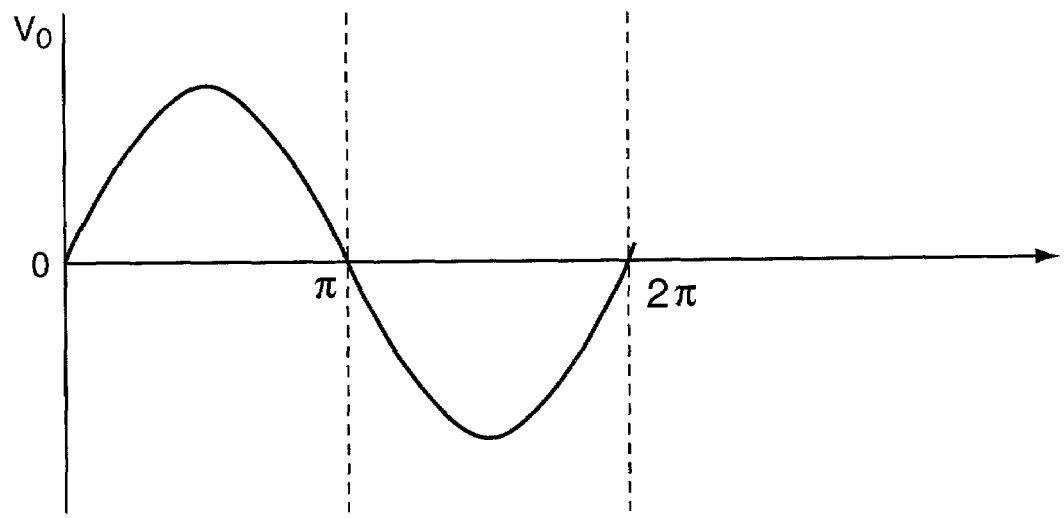
FIG. 6 depicts a representative graph of an alternating cycle of the AC voltage in an electrical conductor in accordance with the invention.
Figure 7:
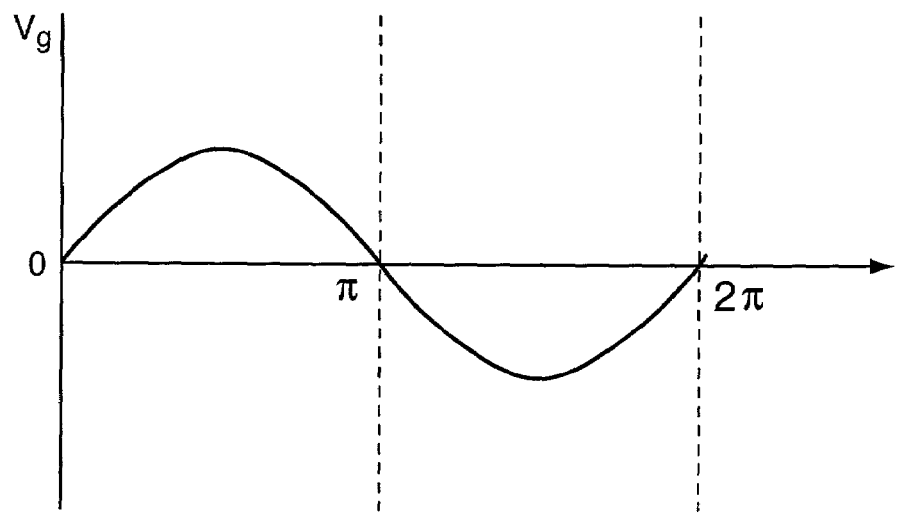
FIG. 7 depicts a representative graph of voltage as a function of cycle time across a gas-filled layer without electric breakdown.
Figure 8:
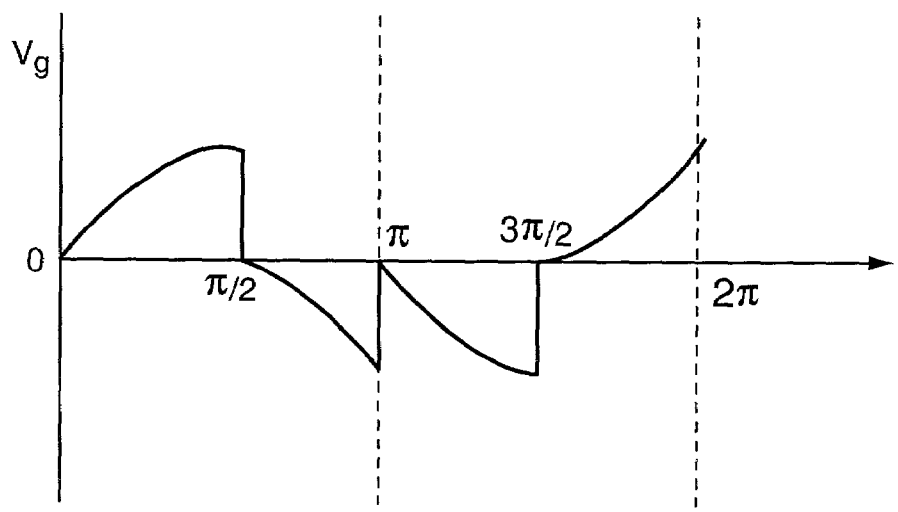
FIG. 8 depicts in schematic form a representative graph of voltage as a function of cycle time in a gas-filled layer with electric breakdown in accordance with the invention.

The operation of circuit 240 is described with reference to FIGS. 6–8. FIG. 6 depicts a graph of an alternating cycle of the AC voltage, $V_0$, in electrical conductor 204. FIG. 7 depicts a corresponding graph of "gap voltage", $V_g$, across gas-filled layer 210 as a function of cycle time, without electric discharge through a plasma. In contrast, FIG. 8 depicts in schematic form a graph of "gap voltage", $V_g$, in the gas-filled layer as a function of cycle time with electric breakdown and electric discharge through the plasma in gas-filled layer 210, in accordance with the invention. In a given system, the frequency of electric charge accumulation and electric breakdown and discharging depends on the operating voltage, AC frequency, plasma composition and pressure, physical dimensions, and other operating variables. Preferably, the composition and pressure of the plasma-forming gas in the gas-filled layer is selected so that four electric discharges occur per AC cycle. Electric breakdown and discharging occuring in such a pattern release power available for heating and melting ice. In the graph of FIG. 8, electric breakdown occurs at peak field strength.

Figure 9:
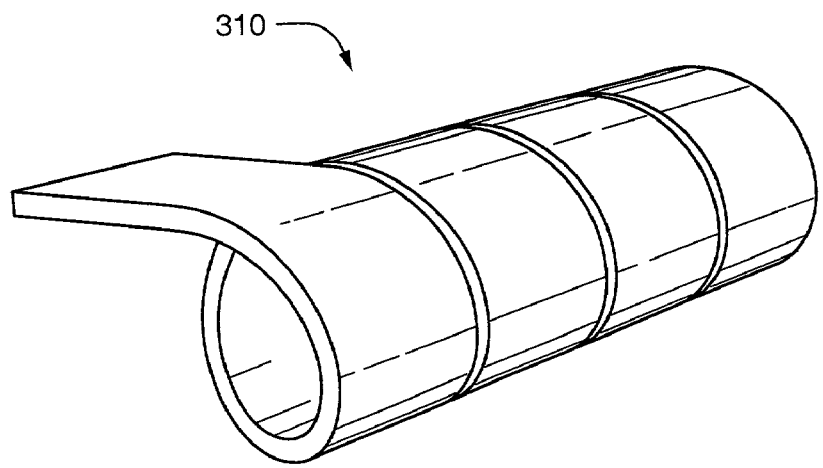
FIG. 9 shows a flexible gas-filled band that may be wrapped in a spiral-like fashion around a power line, or around some other object being protected against ice in accordance with the invention.
Figure 10:
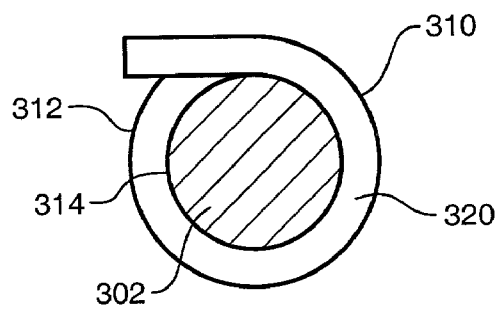
FIG. 10 shows an electrical conductor covered by a flexible band that includes a gas-filled layer in accordance with the invention.

The gas-filled layer may have different structures and be formed in various ways. In a typical embodiment, a gas-filled layer is disposed on an object being protected against ice. As depicted in FIG. 2, outer shell 106 may be a rigid outer shell surrounding a power line, or other object being protected, thereby forming an enclosed space that can be filled with a selected plasma-forming gas at a selected pressure. Another example of a gas-filled layer in accordance with the invention is depicted in FIG. 9, which shows a flexible gas-filled band 310 that may be wrapped in a spiral-like fashion around a power cable, or around some other object being protected. FIG. 10 shows electrical conductor 302 covered by a flexible band 310 in accordance with the invention. The flexible band has an outer wall 312 and an inner wall 314 that are joined and sealed together along their edges, but which are electrically insulated from each other. The volume between outer wall 312 and inner wall 314 is filled with gas at a desired pressure to form a gas-filled layer 320 in accordance with the invention.

Figure 11:
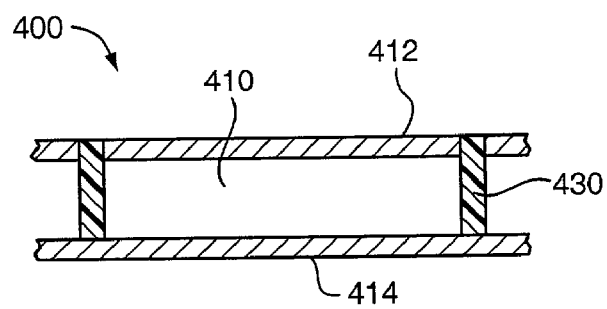
FIG. 11 depicts a section of a gas-filled layer enclosed by a conductive outer shell in accordance with the invention, wherein the section of conductive outer shell is electrically insulated from the rest of the outer shell to prevent discharge at one location of large amounts of charge accumulated on the outer shell.

An outer shell or an outer wall 312 may be conductive or nonconductive. If an outer shell, outer wall or permanent conductive layer is conductive, then it is preferably divided by electrical insulation into short sections. For example, a conductive outer wall 312 around a power line is preferably divided by electrical insulation into short sections not exceeding about 10 meters length. If an outer shell, outer wall or permanent conductive layer covers another structure, then it is preferably divided into similarly small electrically isolated areas. This is because all of the charge accumulated on a conductive outer shell or wall discharges at the single location at which electric breakdown occurs. If the area with accumulated charges is large, then the large electric discharge damages the outer shell or wall. FIG. 11 depicts a section 400 of a gas-filled layer 410 enclosed by conductive outer shell 412 and the surface of electrical conductor 414. Conductive outer shell 412 of section 400 is electrically isolated from the rest of the conductive outer shell by dielectric insulator spacers 430, which also physically separate electrical conductor 414 and outer shell 412 to form the space occupied by gas-filled layer 410. Preferably, an outer shell or outer wall that is conductive includes only a thin layer of metal or conductive metal oxide. A thin layer of metal, for example, with a thickness of about 0.1 mm, does not influence the electric field strength of an AEF. Thus, an embodiment having a thin conductive outer shell is self-regulating because plasma formation and electric discharge occur only when ice having a certain thickness covers the outer shell (or conductive wall), thereby increasing electric field strength.

Some embodiments of the invention with a thick conductive outer shell, outer wall, or permanent conductive layer also include a switch between the electrical conductor and the outer shell for turning the system "on" and "off". This system is turned "off" by closing the switch, which electrically shorts the electrical conductor and the outer shell, thereby reducing the electric field strength in the gas-filled layer to substantially zero and practically preventing electric breakdown and discharge. For example, a conductive outer shell with a metal layer of 1 mm thickness significantly increases the electric field strength between the electrical conductor in the outer shell. A switch for electrically shorting an electrical conductor to an outer layer is impractical, however, in embodiments in which an outer shell, an outer wall or permanent conductive layer is divided into many electrically isolated sections.

If an outer shell or outer wall of a flexible band is nonconductive, then the discharge current flows only across the gas-filled layer between the conductor and the outer shell or wall; it does not flow along a surface of the nonconductive outer shell or wall. As a result, large amounts of accumulated charge do not discharge at a single location. A nonconductive outer shell or outer wall may be fabricated using conventional dielectric materials, such as plastic, glass or ceramic.

Figure 12:
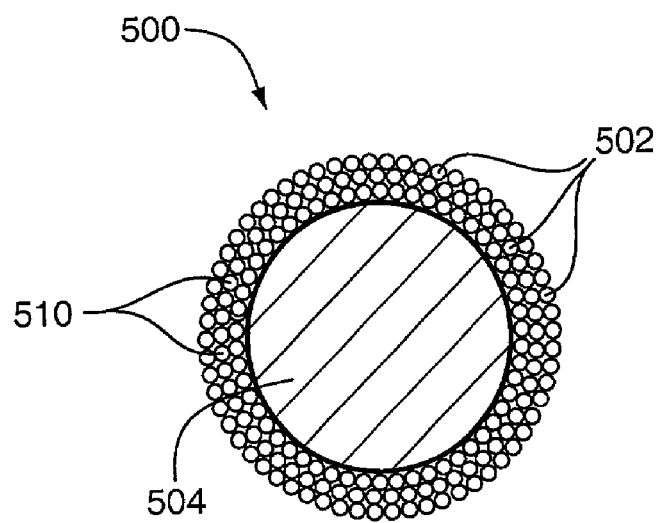
FIG. 12 depicts in schematic form a cross-sectional view of an embodiment in accordance with the invention in which a large number of small gas-containing balls are attached by adhesive or by some other means around an electrical conductor to form a gas-filled layer.
Figure 13:
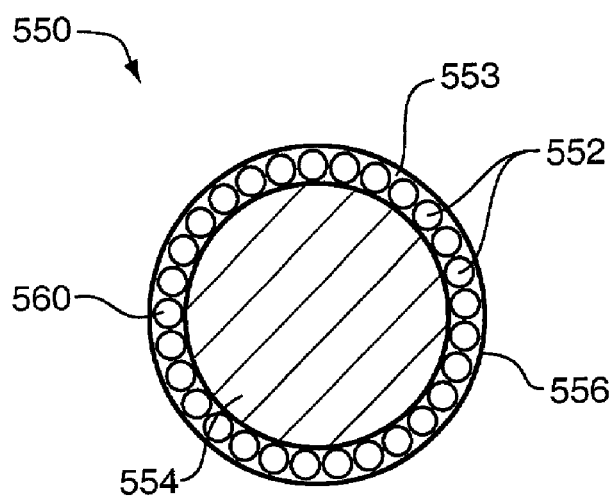
FIG. 13 depicts an embodiment in accordance with the invention of gas-filled balls enclosed in the space between an electrical conductor and an outer shell, thereby forming a gas-filled layer.

FIG. 12 depicts in schematic form a cross-sectional view of an embodiment 500 in which a large number of small balls 502 are attached by adhesive or by some other means around an electrical conductor 504 to form a gas-filled layer 510 in accordance with the invention. The balls 502 are formed by walls of suitable dielectric material, and they are filled with suitable plasma-forming gas at a desired pressure. FIG. 13 depicts a similar embodiment 550 with gas-filled balls 552 enclosed in the space 553 between conductor 554 and outer shell 556, thereby forming a gas-filled layer 560 in accordance with the invention. In embodiments as in FIG. 13 in which the gas-filled layer is formed by gas-filled balls with dielectric walls, it does not matter whether outer shell 556 is electrically conductive or nonconductive because the discharge current flows only across the gas filled layer 560, not along the shell wall 556.

Typically, the surface of an electrically conductive structure itself is being protected from ice or snow, in accordance with the invention. For example, similar to power line de-icing, the surface of a conductive airplane wing may be protected by disposing a gas-filled layer in accordance with the invention on the wing surface and flowing AC current at a suitable voltage through the wing. In other instances, a gas-filled layer may be embedded in the object being protected, below the surface exposed to icing. For example, a gas-filled layer in accordance with the invention may be formed as a layer enclosed within an airplane wing.

The gas in the gas-filled layer may be selected from a large number of plasma-forming gases, including, but not exclusively, air, nitrogen and argon.

An advantage of a preferred de-icing system or method in accordance with the present invention is that it does not need a switch or "control" box to turn the heating "on" or "off". When ice grows on the power line or other surface being protected, the AEF between the conductor and the ice increases, reaching an electric breakdown and plasma-formation level. This is because ice is a better conductor than air. When ice is present, the electric field strength in the gas-filled layer is higher than in the absence of ice. After the ice melts, the field strength within the gas-filled layer decreases, virtually stopping electric breakdown and discharge, with a corresponding reduction in energy consumption. The pressure of the gas in the gas-filled layer can be adjusted to such a level that electric breakdown starts only when the ice thickness reaches a certain value, such as 0.5 cm or 2 cm or any other desired dimension.

A further advantage of a system or a method in accordance with the invention is that it provides more heating power for a given conductor voltage than dielectric loss heating. With reference to the circuit diagram in FIG. 5 and the graph of FIG. 8, the increase in heating power efficiency can be explained, as follows.

With desired control of operating variables, there are four discharges per AC cycle, as explained above with reference to FIG. 8. The electric energy, E, stored in gap capacitance, $C_g$, just before a discharge is:

$$\frac{C_g V_c^2}{2}, \text{ where } V_c^2 \text{ is a pick (not rms) value.} \quad (1)$$

With a rms value, $V_c'$, the energy is: $E = C_g (V_c')^2$

With a given frequency of $f$, there are $4f$ such discharges per cycle. Therefore, the total electric power dissipated is:

$$W_h^* = 4f \, C_s (V_c')^2 = \frac{4f C_i^2 V_0^2}{C_i + C_g} \quad (2)$$

in which $V_0$ is the rms of the line voltage.

In a system in which a solid lossy dielectric coating absorbs electrostatic energy of an AEF through a dielectric capacitance, $C_d$, the maximum heating power of the coating is expressed by the equation $$W_h = \frac{\omega \, C_i^2 V_0^2}{2(C_i + C_d)}. \quad (3)$$

The value of the dielectric capacitance, $C_d$, is the product of its relative dielectric constant, $\epsilon$, and the capacitance of a vacuum gap, which is approximated by the value of $C_g$. Thus, $$C_d \approx \epsilon C_g \quad (4)$$

A lossy dielectric coating has a relative dielectric constant, $\epsilon$, of at least 2.3. Thus, the capacitance, $C_d$, of the power line and the lossy dielectric material can be represented as:

$$C_d \approx 2.3 C_g \quad (5)$$

Substituting this conservative value of $C_d$ into Equation (3), and then dividing Equation (2) by Equation (3) yields:

$$\frac{W_h^*}{W_h} \approx 3 \quad (6)$$

Thus, the heating power of plasma discharge, $W_h^*$, in accordance with the invention exceeds the heating power of dielectric loss heating.

An embodiment in accordance with the invention may include a transformer to transform AC current having a low-voltage to a higher voltage sufficient to generate heat in a gas-filled layer. Such transformers, for example, may be located at appropriate distance intervals along power transmission lines.

Those skilled in the art should appreciate that the surface of objects other than described herein can also be protected with these gas-filled layers. For example, applying such a gas-filled layer to an airplane wing will also provide de-icing capability by subjecting the gas-filled layer to an AEF and, in particular, by increasing the AC voltage and frequency. Embodiments in accordance with the invention including a conductive outer shell or other permanent conductive layer are especially useful for generating heat in a gas-filled layer when no ice is present.

Operating variables typically considered in selecting gas composition and pressure may include: AC frequency and voltage in the electrical conductor, ice thickness at which heating is desired, gas layer thickness, distance between the voltage-carrying electrical conductor and the conductive layer, and heat transfer behavior between the gas-filled layer and ice on the surface.

The various embodiments in accordance with the invention provide relatively simple, reliable and inexpensive systems and methods for removing ice on the surface of an object. Although the embodiments have been described principally with regard to power line de-icing, the structures and methods herein described are applicable to many other types of objects. Embodiments have been described herein with reference to "de-icing". It is clear that embodiments in accordance with the invention or useful for removing other forms of frozen water, such a snow. It is also understood that embodiments in accordance with the invention are generally useful for generating heat in a variety of applications, besides removing ice snow. Also, the ranges of frequency, voltage, alternating electric field strength, thicknesses and other variables specified in the description are not exclusive. Therefore, systems and methods may be devised in which variable values depart from those named herein, but still remain within the scope of the invention. Thus, certain changes may be made in the above systems and methods without departing from the scope of the invention, and it is intended that all matter includeed in the above description or shown in the accompanying drawings be interpreted as illustrative and not in a limiting sense.

The invention claimed is:

1. A system for melting ice, comprising:
 an electrical conductor for generating an AEF in response to an AC voltage;
 a gas-filled layer proximate to the electrical conductor, the gas-filled layer containing a plasma-forming gas for forming a plasma in response to an AEF; and
 a permanent outer shell, wherein the gas-filled layer is disposed between the electrical conductor and the permanent outer shell.

2. A system as in claim 1, wherein the permanent outer shell comprises a conductive layer.

3. A system as in claim 1, wherein ice on the permanent outer shell forms a conductive layer.

4. A system as in claim 1, wherein the electrical conductor is a main conductor of a power transmission line.

5. A system as in claim 1, further comprising:
an AC power source for applying an AC voltage to the electrical conductor.

6. A system as in claim 1, further comprising:
an AC voltage in the electrical conductor that generates an AEF, which AEF causes electric breakdown in the gas-filled layer.

7. A system as in claim 6, wherein the AC voltage has a frequency in a range of about from 50Hz to 1 MHz.

8. A system as in claim 6, wherein the AC voltage has a voltage in a range of about from 10 kV to 1300 kV.

9. A system as in claim 1, wherein the gas-filled layer comprises a gas selected from the group consisting of air, nitrogen and argon.

10. A system as in claim 1, wherein the gas-filled layer has a thickness in a range of about from 0.5 to 10 mm.

11. A system as in claim 1, wherein the permanent outer shell is electrically nonconductive.

12. A system as in claim 1, wherein the permanent outer shell is electrically conductive.

13. A system as in claim 12, further comprising a switch for electrically shorting the electrical conductor and the conductive permanent outer shell.

14. A system as in claim 1, wherein the gas-filled layer comprises gas-containing balls.

15. A system as in claim 1, wherein the permanent outer shell is a flexible band and wherein the gas-filled layer is contained within the flexible band.

16. A system for generating heat, comprising:
an electrical conductor for generating an AEF in response to an AC voltage;
a gas-filled layer proximate to the electrical conductor, the gas-filled layer containing a plasma-forming gas for forming a plasma in response to the AEF;
an AC power source for applying an AC voltage to the electrical conductor; and
a permanent outer shell, wherein the gas-filled layer is disposed between the electrical conductor and the permanent outer shell.

17. A system as in claim 16, wherein the permanent outer shell comprises a conductive layer.

18. A system as in claim 16, wherein the AC power source provides an AC voltage for generating an AEF having sufficient field strength to cause electric breakdown of gas in the gas-filled layer when a conductive layer is proximate to the electrical conductor.

19. A system as in claim 16, wherein the AC power source provides an AC voltage for generating an AEF having a strength in a range of about from 1 to 100 kV/cm.

20. A system as in claim 16, wherein the AC power source provides and AC voltage in a range of about front 10 kV to 1300 kV.

21. A system as in claim 16, wherein the AC power source provides an AC voltage having a frequency in a range of about from 50 Hz to 1 MHz.

22. A method for melting ice, comprising a step of:
generating an AEF in a gas-filled layer proximate to the ice for causing electric breakdown of gas and the formation of plasma in the gas-filled layer, wherein the gas-filled layer is disposed between an electrical conductor and a permanent outer shell.

23. A method as in claim 22, wherein the step of generating an AEF includes generating an AEF having a strength in a range of about from 1 to 100 kV/cm.

24. A method as in claim 22, wherein the step of generating an AEF includes applying an AC voltage to an electrical conductor.

25. A method as in claim 24, wherein applying an AC voltage to the electrical conductor includes applying a voltage in a range of about from 10 kV to 1300 kV.

26. A method as in claim 24, wherein applying an AC voltage to the electrical conductor includes applying a voltage with a frequency in a range of about from 50 Hz to 1 MHz.

27. A method as in claim 24, wherein the electrical conductor is a main conductor of a power transmission line.

28. A meted as in claim 22, wherein ice on the permanent outer shell forms a conductive layer.

29. A method as in claim 22, wherein the permanent outer shell comprises a conductive layer.

30. A method as in claim 29, wherein the conductive layer includes a conductive metal-containing material.

* * * * *

UNITED STATES PATENT AND TRADEMARK OFFICE
CERTIFICATE OF CORRECTION

PATENT NO. : 7,138,599 B2
APPLICATION NO. : 10/043752
DATED : November 21, 2006
INVENTOR(S) : Victor E. Petrenko It is certified that error appears in the above-identified patent and that said Letters Patent is hereby corrected as shown below:

Column 1, lines 14, 18, 24 and 30, each instance of "and PCT application" should read --PCT application--;
line 22, insert before the period at the end of the sentence --and the benefit of U.S. provisional application Ser. No. 60/131,032, filed April 26, 1999, now abandoned--;
line 41, "Awarded" should read --awarded--;
Column 12, line 38, "28. A meted" should read --28. A method--;

Signed and Sealed this

Fourth Day of March, 2008

JON W. DUDAS
*Director of the United States Patent and Trademark Office*